US010565988B2

(12) United States Patent
Dacosta

(10) Patent No.: US 10,565,988 B2
(45) Date of Patent: Feb. 18, 2020

(54) SPEECH RECOGNITION FOR INTERNET VIDEO SEARCH AND NAVIGATION

(71) Applicant: SONY CORPORATION, Tokyo (JP)

(72) Inventor: Behram Mario Dacosta, San Diego, CA (US)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 15/064,035

(22) Filed: Mar. 8, 2016

(65) Prior Publication Data

US 2016/0189711 A1 Jun. 30, 2016

Related U.S. Application Data

(63) Continuation of application No. 11/590,386, filed on Oct. 31, 2006, now Pat. No. 9,311,394.

(51) Int. Cl.
*G10L 15/22* (2006.01)
*G06F 16/73* (2019.01)
*G06F 16/732* (2019.01)
*G06F 16/783* (2019.01)
*H04N 21/231* (2011.01)
*H04N 21/422* (2011.01)
*H04N 21/433* (2011.01)
*H04N 21/438* (2011.01)
*H04N 21/4415* (2011.01)
*H04N 21/61* (2011.01)
(Continued)

(52) U.S. Cl.
CPC .............. *G10L 15/22* (2013.01); *G06F 16/73* (2019.01); *G06F 16/7328* (2019.01); *G06F 16/7834* (2019.01); *G10L 15/10* (2013.01);
*G10L 15/26* (2013.01); *G10L 15/265* (2013.01); *H04N 21/23109* (2013.01); *H04N 21/42203* (2013.01); *H04N 21/42222* (2013.01); *H04N 21/4332* (2013.01); *H04N 21/4381* (2013.01); *H04N 21/4415* (2013.01); *H04N 21/4884* (2013.01); *H04N 21/6125* (2013.01); *H04N 21/64322* (2013.01); *G10L 2015/025* (2013.01); *G10L 2015/223* (2013.01)

(58) Field of Classification Search
CPC ............................... G10L 15/22; G10L 15/30
See application file for complete search history.

(56) References Cited

U.S. PATENT DOCUMENTS 5,481,296 A * 1/1996 Cragun ............. G06F 17/30796
348/461
5,835,667 A * 11/1998 Wactlar ............ G06F 17/30787
386/241
(Continued)

OTHER PUBLICATIONS

Huang, Xuedong, et al. "The SPHINX-II speech recognition system: an overview." Computer Speech & Language 7.2 (1993): 137-148.*

*Primary Examiner* — Matthew H Baker
(74) *Attorney, Agent, or Firm* — John L. Rogitz

(57) ABSTRACT

Speech representing a desired video site or video subject is detected and digitized at a TV remote, and then sent to a TV. The TV or in some embodiments an Internet server communicating with the TV use speech recognition principles to recognize the speech, enter a database using the recognized speech as entering argument, and return a link to an Internet site hosting the desired video. The link can be displayed on the TV for selection thereof by a user to retrieve the video.

26 Claims, 1 Drawing Sheet

(51) Int. Cl.
*H04N 21/643* (2011.01)
*G10L 15/26* (2006.01)
*G10L 15/10* (2006.01)
*H04N 21/488* (2011.01)
*G10L 15/02* (2006.01)

(56) References Cited

U.S. PATENT DOCUMENTS

| | | | | |
|---|---|---|---|---|
| 6,075,575 | A * | 6/2000 | Schein | H04N 5/44543 345/684 |
| 6,397,186 | B1 * | 5/2002 | Bush | G10L 15/26 704/274 |
| 6,430,357 | B1 * | 8/2002 | Orr | G06F 17/30796 348/423.1 |
| 6,480,819 | B1 * | 11/2002 | Boman | G10L 15/26 704/257 |
| 6,526,381 | B1 * | 2/2003 | Wilson | G08C 17/02 379/88.01 |
| 6,543,052 | B1 * | 4/2003 | Ogasawara | G06Q 30/06 348/734 |
| 6,710,812 | B2 * | 3/2004 | Taylor, Jr. | G06F 17/30616 348/465 |
| 6,747,566 | B2 * | 6/2004 | Hou | G08C 23/04 340/12.22 |
| 6,889,191 | B2 * | 5/2005 | Rodriguez | G06F 17/2735 704/228 |
| 6,965,890 | B1 * | 11/2005 | Dey | G06F 17/30017 |
| 7,013,273 | B2 * | 3/2006 | Kahn | G10L 15/26 348/468 |
| 7,299,183 | B2 * | 11/2007 | Abe | H04N 5/04 348/E5.009 |
| 7,321,857 | B2 * | 1/2008 | Rodriguez | G06F 17/2735 704/228 |
| 7,340,763 | B1 * | 3/2008 | Harris | H04N 7/17318 348/734 |
| 7,529,677 | B1 * | 5/2009 | Wittenberg | G10L 15/30 704/270 |
| 7,689,589 | B2 * | 3/2010 | Wong | G06F 17/30864 707/999.107 |
| 7,779,342 | B2 * | 8/2010 | Dey | G06F 17/30855 715/202 |
| 7,801,910 | B2 * | 9/2010 | Houh | G06F 17/30247 707/728 |
| 7,877,774 | B1 * | 1/2011 | Basso | G06F 17/3002 725/115 |
| 8,285,701 | B2 * | 10/2012 | Swart | H04N 7/17318 707/709 |
| 9,311,394 | B2 * | 4/2016 | Dacosta | G06F 17/30787 |
| 2002/0015106 | A1 * | 2/2002 | Taylor, Jr. | G06F 17/30616 348/465 |
| 2003/0028896 | A1 * | 2/2003 | Swart | H04N 7/17318 725/127 |
| 2003/0107592 | A1 * | 6/2003 | Li | G06F 17/30787 715/745 |
| 2003/0191754 | A1 * | 10/2003 | Dey | G06F 17/30855 |
| 2004/0199502 | A1 * | 10/2004 | Wong | G06F 17/30864 |
| 2005/0038814 | A1 * | 2/2005 | Iyengar | G06F 17/30038 |
| 2006/0028337 | A1 * | 2/2006 | Li | G08C 17/00 340/539.1 |
| 2007/0016847 | A1 * | 1/2007 | Reichardt | G11B 27/105 715/202 |
| 2007/0234397 | A1 * | 10/2007 | Pearson | H04N 5/44513 725/137 |

* cited by examiner

SPEECH RECOGNITION FOR INTERNET VIDEO SEARCH AND NAVIGATION

I. FIELD OF THE INVENTION

The present invention relates generally to speech recognition for Internet video and navigation using TV-centric systems.

II. BACKGROUND OF THE INVENTION

The present invention recognizes that it can be difficult for a viewer to input textual information into a television using a remote control tax various purposes. For example, if a user of an Internet-enabled TV would like to search the Internet for video related to "Subject A" so that the video can be played on the TV, there is no easy way to give the TV this information, unlike a computer which has a keyboard that can be used. A keyboard can be provided with a TV, but as understood herein this is not fully consistent with the relaxed user experience that is typically associated with watching television.

As also recognized herein, another option for allowing user input is to use "soft keyboard" that appears on the screen, and that requires the user to use cursor keys on the remote control to select individual characters of the desired search subject. As also understood herein, however, such a way to input text is tedious.

SUMMARY OF THE INVENTION

A system includes a TV communicating with the Internet and a remote control device wirelessly communicating with the TV. A microphone is on the remote control device and the remote control device digitizes speech signals representing a desired video site or video subject from the microphone, sending the signals to the TV. A processor implements speech recognition on received speech signals representing a desired video site or video subject to generate recognized speech. This speech recognition is performed in the context of a grammar constructed from information within Internet video sites as well as information in the user's context of having viewed the TV content i.e. closed captioned text. This recognized speech is an index. A database containing at least one index correlating speech with Internet addresses can be accessed by the processor using the recognized speech to return an Internet address of an Internet site.

In one implementation, the processor and database are located at an Internet server. In another implementation, the processor and database are located in the TV. In this latter implementation, the database can include an index derived from closed captioned text received by the TV, EPG (electronic program guide) information, and/or text input by a user, for a predetermined time (e.g., only information received for a most recent predetermined time period) or for a predetermined data amount (e.g., or the most recent "X" amount of information received, wherein "X" is a predetermined data amount.) The database may also include information representing items that are initial, manufacturer-defined grammar.

In another aspect, a method for returning an Internet address of an Internet site storing a desired video includes digitizing speech input to a TV remote. The speech is related to the video. The speech is sent to a TV, and at least phonemes in the speech are recognized. Using the phonemes as entering argument, a database is accessed to retrieve the Internet address.

In still another aspect, a computer program product has a computer-readable medium that bears means for recognizing digitized speech representing a video and generating recognized speech in response. The speech is initially detected by a TV remote control. The computer program product also has means for accessing a data structure correlating speech representing video to Internet addresses of sites storing the video, and means retrieving, from the data structure, at least one Internet address correlated to a match.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
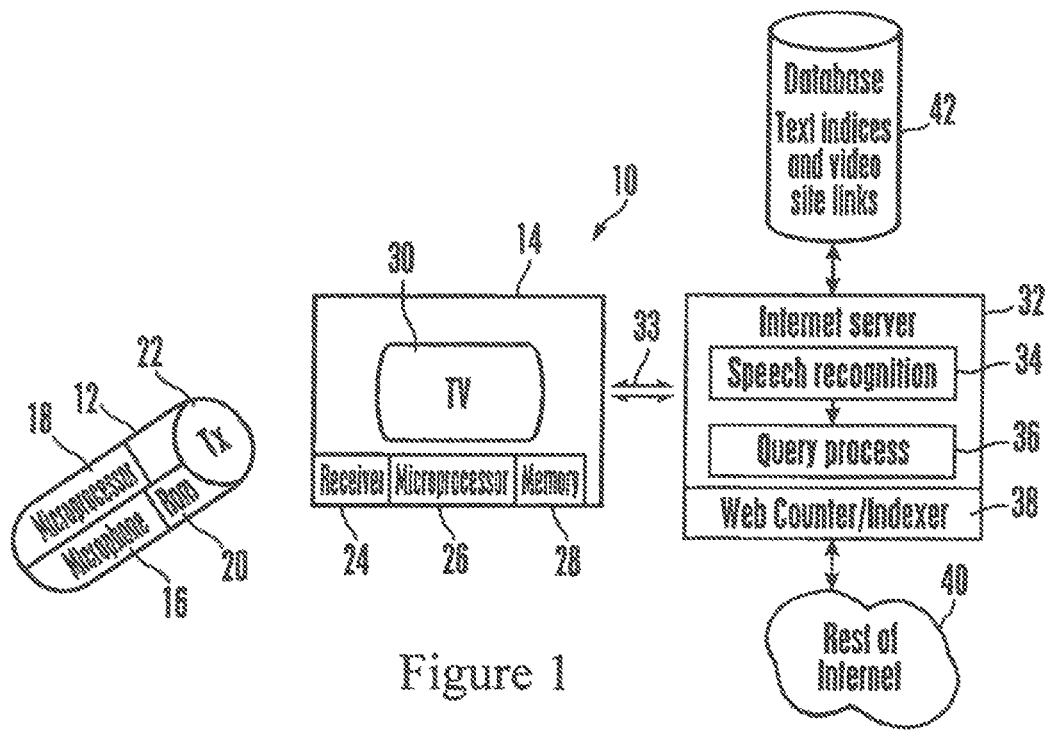
FIG. 1 is a block diagram of a first non-limiting embodiment of the present system.

Referring initially to FIG. 1, a system is shown, generally designated 10, that includes a wireless hand-held TV remote control device 12 that can control a TV 14 in accordance with remote control principles known in the art. In the non-limiting embodiment shown, among other components such as a remote control keypad, the remote 12 has a microphone 16 for receiving voice commands from a person and a remote control microprocessor 18 for digitizing the signals from the microphone 16. The signals if desired can be stored in memory 20 such as random access memory (RAM) and can be sent to the TV 14 by a RF or IR transmitter 22 in the remote 12, for reception of the signals by a receiver 24 in the TV 14.

The TV 14 can also include a TV processor 26 that can access a non-volatile TV memory 28 (NV RAM and/or hard disk drive/optical disk drive), and the TV processor 26 can be operably associated with a TV display 30 such as a flat panel display or cathode ray tube for displaying video thereon.

In the embodiment shown, the TV 14 can communicate with an Internet server 32 over a wired or wireless wide area network link 33 or other link in accordance with network principles known in the art. The server 32 includes a speech recognition module 34 which can recognize phonemes/words/phrases in digitized speech. The server 32 also includes a query processor 36 and a Web indexer/crawler 38 that can access the rest of the Internet 40 for purposes to be shortly disclosed to populate a text indices and video site links database 42 that is associated with the Internet server 32.

More specifically, the web crawler/indexer 38 navigates the Internet and generates reference indices that may be used to refer to videos. Non-limiting examples of the sources for words/phonemes in the indices of the database include (1) closed captioned text that appear with videos, (2) digitized voice "soundtracks" that accompany the video, which is analyzed for phonemes and then indexed, (3) descriptive text that appears with the video, and (4) actual image recognition on the video itself. These indices, together with the location (Internet site) of the corresponding videos, are stored in the database 42.

Figure 2:
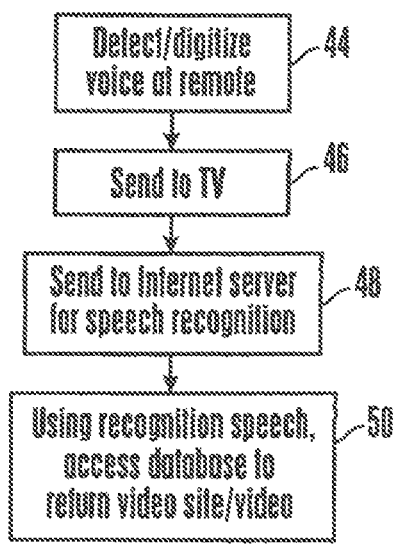
FIG. 2 is a flow chart showing a non-limiting logic that can be used by the system of FIG. 1.

With the above system architecture in mind, attention is drawn to FIG. 2 to understand one non-limiting method of the present invention. Commencing at block 44, speech is detected and digitized at the remote 12. The digitized speech is sent to the TV 14 at block 46 using the remote transmitter 22 and TV receiver 24, so that the TV processor 26 can relay the digitized speech at block 48 to the server 32 for recognition thereof by the speech recognition module 34. In accordance with one aspect of the invention, the speech discussed above is the title of a video, subject of a video, or location of a video on the Internet. The speech recognition module 34 can recognize the video subject or video site using methods known in the field of speech recognition, such as, e.g., matching and analyzing phonemes for the digitized speech and contents of the database 42.

As understood herein, speech recognition requires a context (grammar) to be accurate, and this grammar is provided by the information in the database 42. Accordingly, after speech recognition at block 48, the logic moves to block 50 to use the recognized phonemes to retrieve matching contents in the database 42. More specifically, at block 50 the recognized phonemes from block 48 are matched to phonemes/words in the indices of the database 42 and then the corresponding video site links are returned to the TV 14 where they can be displayed on the monitor 30 for selection of a link by the user by means of the remote 12, in order to retrieve the actual video content from the selected site. It is to be understood that the indices in the database may also be based on video speech "soundtrack" or the phonemes of video speech soundtracks as detected by the remote 12.

Figure 3:
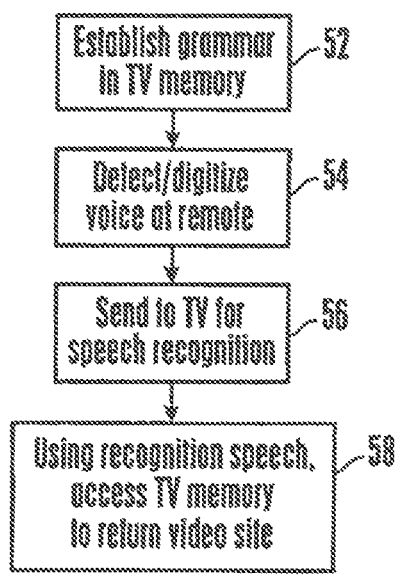
FIG. 3 is a flow chart showing an alternate non-limiting logic that can be used.

The speech recognition may occur using a further limited grammar, where the grammar is based on audio corresponding with video viewed by the user, or metadata corresponding to video viewed by the user. FIG. 3 shows an alternate logic that can be used and that is wholly contained within the home (TV 14 and remote control 12) without resort to accessing the server 32. At block 52 a limited grammar is maintained in the memory 28 of the television 14, so that memory and processing requirements to process this grammar are manageable within the confines of typical TV processors and storages. In one implementation, the limited grammar database may if desired include indices derived from the closed captioned text and metadata received by the TV, as well as text that the user might have downloaded from the Internet and other sources (e.g. QAM broadcast, IPTV, etc.) for a limited time or data amount, e.g., for the past "X" bytes or "Y" hours. The grammar may also include items that are input (trained) by the viewer and a limited, initial, manufacturer-defined grammar that is considered relevant to TV content selection that is permanently part of the memory 28.

Moving to block 54, speech is detected and digitized at the remote 12. The digitized speech is sent to the TV 14 at block 56 using the remote transmitter 22 and TV receiver 24, so that the TV processor 26 can execute speech recognition thereof by a speech recognition module accessible to the TV processor 26. After speech recognition at block 56, the logic moves to block 58 to use the recognized phonemes to retrieve matching contents in the TV memory 28, so that the corresponding video site links can be displayed on the monitor 30 for selection of a link by the user by means of the remote 12, in order to retrieve the actual video content from the selected site. The matching contents in this implementation may be larger sequences of words and phrases within EPG, metadata, and closed captioned text that contain the recognized speech, and may be passed to an Internet search engine to return addresses of web pages with contents that match the recognized speech. This speech recognition may occur entirely within the RC, or TV, or devices connected to the TV, or it different parts of the speech recognition may occur within all such devices.

The effect of the method of FIG. 3 is that the speech recognition will work reliably if the user speaks a phrase that has occurred during the broadcast in the past few hours, or if it has occurred in any web page in the past few days.

While the particular SPEECH RECOGNITION FOR INTERNET VIDEO SEARCH AND NAVIGATION is herein shown and described in detail, it is to be understood that the subject matter which is encompassed by the present invention is limited only by the claims.

What is claimed is:

1. A television comprising:
   an audio video receiver;
   a display;
   circuitry configured to:
   receive speech signals representing a video site or video subject;
   implement speech recognition on received speech signals to generate recognized speech data representing a video site or video subject;
   using the recognized speech data representing the video site or video subject, access at least one database including indices derived from at least digitized voice soundtracks that accompany video, or at least descriptive text that is associated with video, or at least both digitized voice soundtracks that accompany video and descriptive text that is associated with video, the indices being associated with the at least one database; and
   at least one index in the indices being correlated with the recognized speech and identified as at least one matching index element from the at least one database, the matching index element being useful for providing video to the display.

2. The television of claim 1, wherein the circuitry is configured to access at least one index derived from text input, for at least a data amount.

3. The television of claim 1, wherein the circuitry is configured to access information received for a most recent time period.

4. The television of claim 1, wherein the circuitry is configured to access a most recent "X" amount of information received, wherein "X" is a data amount.

5. The television of claim 1, wherein the circuitry is configured to access information representing items that are initial, manufacturer-defined grammar.

6. The television of claim 1, wherein the television is configured to maintain a limited grammar database so that memory and processing requirements to process the limited grammar database are manageable within the confines of the processor and memory, the limited grammar database including indices derived at least from the closed captioned text received by the television for a past "X" bytes, the limited grammar database not including indices derived from the closed captioned text received by the television in excess of the past "X" bytes, such that a match to the recognized speech is identified responsive to the recognized speech containing content that has occurred in the broadcast in the past "X" bytes.

7. The television of claim 1, wherein the television comprises a remote control device including the circuitry.

8. The television of claim 1, wherein the indices are derived from at least digitized voice soundtracks that accompany video.

9. The television of claim 1, wherein the indices are derived from at least descriptive text that is associated with video.

10. The television of claim 1, wherein the indices are derived from both digitized voice soundtracks that accompany video and descriptive text that is associated with video.

11. A television comprising:
an audio video device (AVD);
a remote control;
wherein the remote control comprises circuitry to digitize received speech and send the digitized speech to the AVD;
wherein the AVD comprises circuitry to:
generate wireless commands to an audio video device (AVD);
receive digitized speech and generate recognized speech from the digitized speech, the recognized speech being associated with a video;
using the recognized speech as entering argument, access a data structure correlating speech associated with video to computer storage locations of stored video, the data structure comprising at least one index derived from at least digitized voice soundtracks that accompany video, or at least descriptive text that is associated with video, or at least both digitized voice soundtracks that accompany video and descriptive text that is associated with video; and
retrieving, from the data structure, at least an identification of at least one video correlated to a match of the recognized speech.

12. The television of claim 11, wherein remote control device is configured to access at least in part metadata received in video adapted to be presented on the AVD.

13. The television of claim 11, wherein remote control device is configured to access at least in part closed caption text received in video adapted to be presented on the AVD.

14. The television of claim 11, wherein the remote control device is configured to access only information received for a most recent time period.

15. The television of claim 11, wherein the remote control device is configured to access only a most recent "X" amount of information received, wherein "X" is a data amount.

16. The television of claim 11, wherein the remote control device is adapted to remotely control a television receiver.

17. The television of claim 11, wherein the data structure is obtained at least in part using metadata received in video presented on an audio video device (AVD).

18. The television of claim 11, wherein the data structure is obtained at least in part using closed caption text received in video presented on the AVD.

19. The television of claim 11, wherein the index is derived from at least digitized voice soundtracks that accompany video.

20. The television of claim 11, wherein the index is derived from at least descriptive text that is associated with video.

21. The television of claim 11, wherein the index is derived from at least both digitized voice soundtracks that accompany video and descriptive text that is associated with video.

22. A machine-executed method comprising:
receiving speech signals representing a video site or video subject;
implementing speech recognition on received speech signals representing a video site or video subject to generate recognized speech;
using the recognized speech representing the video site or video subject, access at least one database including at least one index derived from at least digitized voice soundtracks that accompany video, or at least descriptive text that is associated with video, or at least both digitized voice soundtracks that accompany video and descriptive text that is associated with video; and
correlating the recognized speech with at least one element of the index identified by the accessing to identify at least one matching index element from the at least one database, the matching index element being useful for providing video to the AVD.

23. The method of claim 22, wherein the index is derived from at least digitized voice soundtracks that accompany video.

24. The method of claim 22, wherein the index is derived from at least descriptive text that is associated with video.

25. The method of claim 22, wherein the index is derived from at least both digitized voice soundtracks that accompany video and descriptive text that is associated with video.

26. A computer-implemented method comprising:
recognizing digitized speech representing a video and generating recognized speech in response;
using the recognized speech representing a video as entering argument, access a data structure correlating speech associated with video to computer storage locations of stored video, the data structure comprising at least one index derived from at least digitized voice soundtracks that accompany video, or at least descriptive text that is associated with video, or at least both digitized voice soundtracks that accompany video and descriptive text that is assocaited with video;
retrieving, from the data structure, at least an identification of at one video correlated to a match of the recognized speech.

* * * * *